C. N. WIKANDER.
ROTARY ENGINE.
APPLICATION FILED MAY 16, 1916.
1,214,981.
Patented Feb. 6, 1917.
3 SHEETS—SHEET 1.
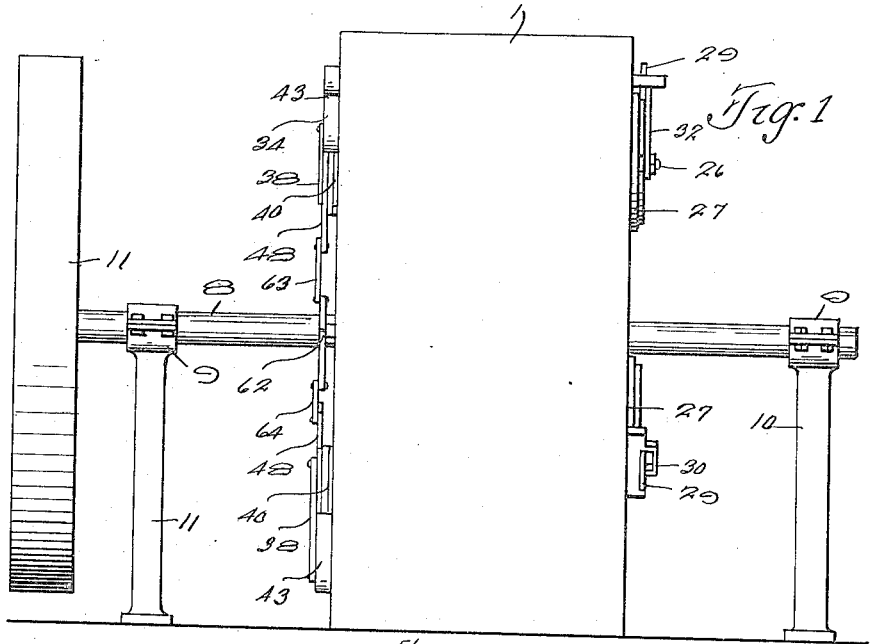

C. N. WIKANDER.
ROTARY ENGINE.
APPLICATION FILED MAY 16, 1916.
1,214,981.
Patented Feb. 6, 1917.
3 SHEETS—SHEET 2.
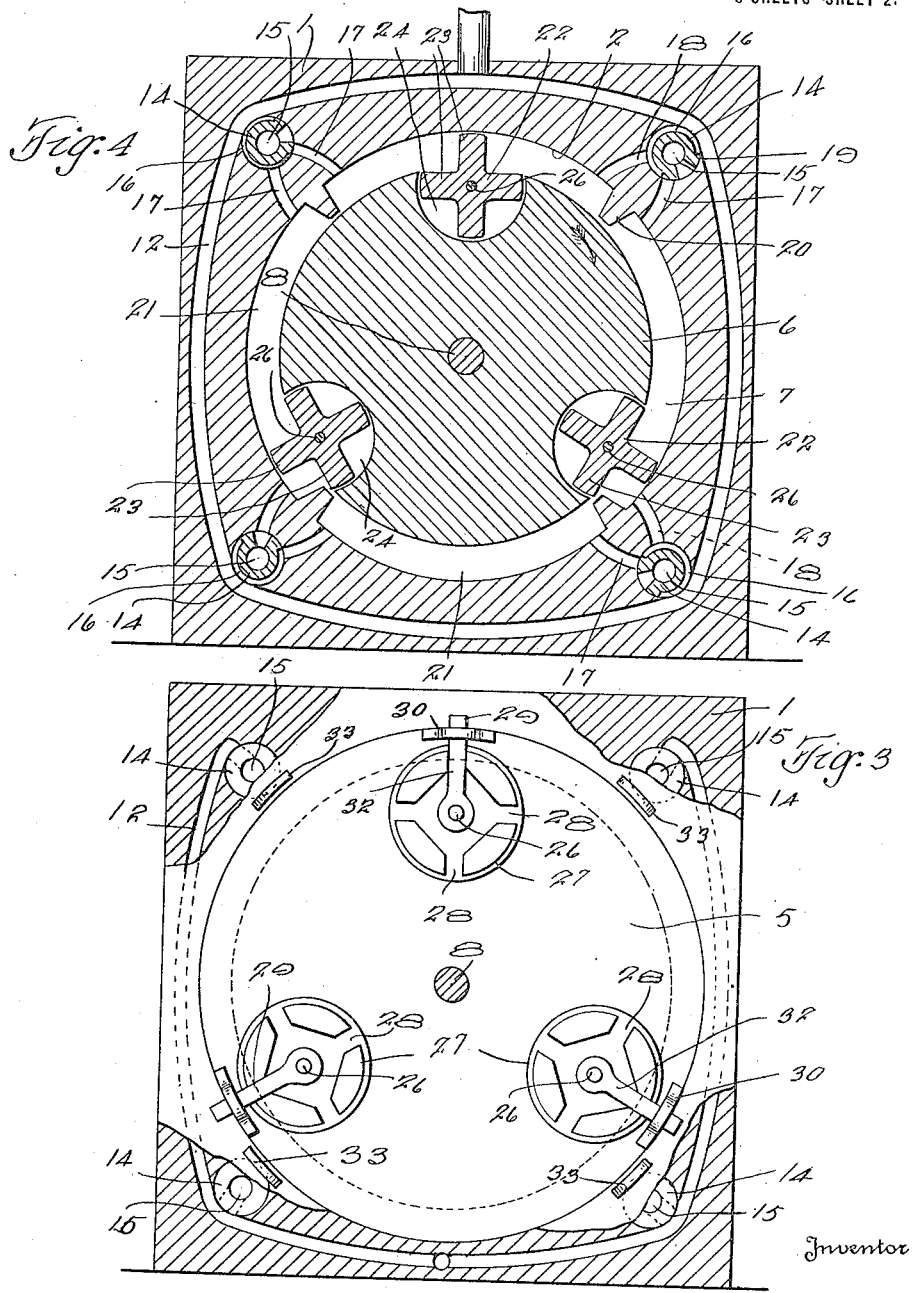
Witnesses
Chas. H. Tuttle
H. H. Riley
Inventor
C. N. Wikander
By N. Hausrath Jr.
Attorney C. N. WIKANDER.
ROTARY ENGINE.
APPLICATION FILED MAY 16, 1916.
1,214,981.
Patented Feb. 6, 1917.
3 SHEETS—SHEET 3.
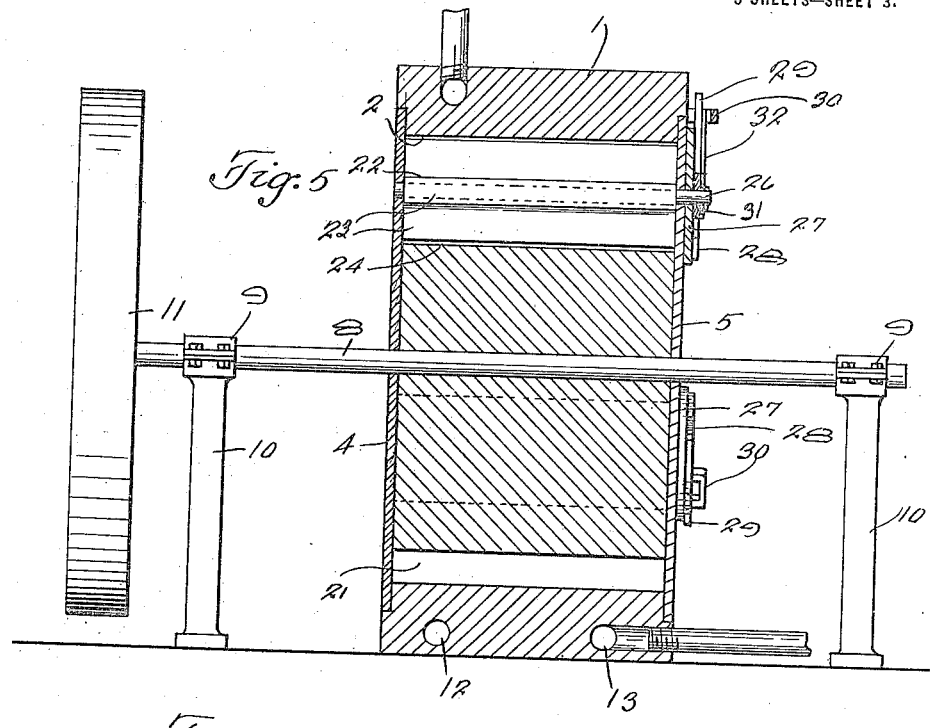
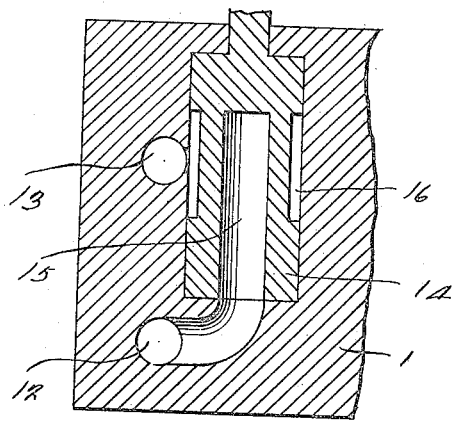
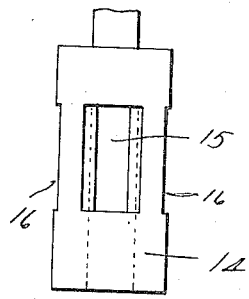
Witnesses
Chas. H. Trotti
J. J. Riley
Inventor
C. N. Wikander
By [signature]
Attorney

UNITED STATES PATENT OFFICE.

CHARLES N. WIKANDER, OF MESKILL, WASHINGTON.

ROTARY ENGINE.

1,214,981.  Specification of Letters Patent.  Patented Feb. 6, 1917.

Application filed May 16, 1916. Serial No. 97,853.

*To all whom it may concern:*

Be it known that I, CHARLES N. WIKANDER, citizen of Sweden, residing at Meskill, in the county of Lewis and State of Washington, have invented certain new and useful Improvements in Rotary Engines; and I do hereby declare the following to be a full, clear, and exact description of the invention, such as will enable others skilled in the art to which its appertains to make and use the same.

The invention relates to improvements in rotary steam engines.

The object of the present invention is to improve the construction of rotary steam engines and to provide a simple, practical and comparatively inexpensive rotary steam engine adapted to afford a maximum power on low pressure steam and capable of economizing fuel and of producing a steady momentum and nearly a noiseless operation.

A further object of the invention is to provide a rotary engine which will be compact and adapted for use as either a stationary or marine engine.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings—

Figure 1 is an end elevation of a rotary engine constructed in accordance with this invention, Fig. 2 is a front elevation of the same, Fig. 3 is a rear elevation partly in section, Fig. 4 is a vertical sectional view, Fig. 5 is a vertical sectional view taken at right angles to Fig. 4.

Figs. 6 and 7 are detail views of the oscillatory valve.

Like numerals of reference designate corresponding parts in all the figures of the drawings.

In the accompanying drawing in which is illustrated the preferred embodiment of the invention, the rotary engine comprises in its construction, a frame or casing 1 having a central circular opening 2 and provided with front and rear heads 4 and 5. The opening 2 is of greater diameter than a rotary piston wheel 6 to provide an intervening space 7 for the steam or other fluid pressure, the rotary engine being designed principally for the use of steam which as hereinafter fully explained is admitted during one-third of the movement of the piston between the feed and exhaust ports and is permitted to expand and actuate the piston during two-thirds of the said movement. The rotary piston wheel 6 is mounted on a horizontal shaft 8 which is journaled in suitable bearings 9 of standards or supports 10 and which carries a fly wheel or pulley 11 located at one end of the shaft and adapted to receive a belt but any other suitable means may of course be employed for transmitting motion from the engine shaft 8.

The frame or casing 1 is provided near its front face with a steam passage 12 which extends entirely around the opening 2 and an exhaust passage 13 located at the back of the casing. The casing which is preferably rectangular as shown may of course be of any desired configuration and it is provided at the corners with valves 14 having feed and exhaust ports 15 and 16 and adapted to be oscillated by the means hereinafter described to connect radially arranged feed and exhaust branch passages 17 and 18 with the main feed and exhaust passages 12 and 13. The valves 14 are circular in cross section and operate in cylindrical valve chambers 19. The casing 1 is provided at the opening 2 with inwardly projecting partitions 20 located between the feed and exhaust branch passages 17 and 18 and dividing the space between the body portion of the casing and the piston wheel in four arcuate steam chambers 21. The rotary piston wheel is provided with a plurality of rotary abutments, preferably three in number and consisting of wheels 22 provided each with four blades 23 and operating in cylindrical chambers 24 located at the periphery of the piston wheel and intersected at their portions by the same so that the blades or abutments of the wheels will project beyond the piston wheel and extend to the wall of the opening 2 of the frame or casing to be operated on by the steam in the steam chambers whereby the piston is actuated in its rotary movement. The rotary abutments or wheels 22 are preferably mounted on shafts or spindles 26 which are supported by the heads or plates 4 and 5 that are suitably secured to and carried by the piston wheel. The abutment wheels 22 are engaged and rotated by the fixed inwardly projecting partitions and they are locked against movement while they are traveling along the spaces between the said partitions by exteriorly arranged wheels 27 mounted on the shaft 26 and provided with radially arranged recesses 28 adapted to be engaged by latches 29. The latches 29 which extend through guides 30 are provided at their inner ends with openings 31 for the reception of the shaft 26 and they are maintained in engagement with the adjacent recesses 28 by springs 32. The keepers which are carried by the rotary plate or head 5 are located adjacent to the outer ends of the latches and the springs preferably extend from the shaft 26 to the keepers and they normally urge the latches inwardly toward the recesses 28. The latches are lifted out of engagement with the recesses 28 to permit the abutment wheels to be rotated by the fixed partitions and this disengagement of the latches is effected by a plurality of fixed cams 33 which are oppositely beveled and which force the latches outwardly out of engagement with the recesses 28. At the completion of the rotary movement of the abutment wheels by the fixed inwardly projecting partitions the latches are released by the cam and reëngage the wheels 22. The valves are oscillated by valve gear which is reversible for rotating the piston in either direction. The valve gear of each valve comprises an arm 34 centrally secured to the front journal 35 of the valve extending from opposite sides thereof and provided with an arcuate slot 36 which receives a pivot 37 of the outer end of the link 38 disposed substantially radially and connected at its inner end by a pivot 39 with a slidable bar or member 40 mounted in suitable guides 41 and 42 and engaged at its outer end by a spring 43 for normally holding the slidable bar or member 40 at the limit of its inward movement to maintain the steam port of the valve closed and the exhaust port open. This spring actuates the slidable bar or member to cut off the steam or feed port which has been opened by the means hereinafter described to admit steam to the steam chamber between the adjacent fixed partition and the projecting blade of the adjacent abutment wheel. The pivot 39 at the inner end of the radially arranged bar or member 40 has mounted on it a reversible lever 44 having angularly related arms 45 provided at their outer sides with catches 46 which are adapted to be engaged by catches 47 of a pivoted substantially V-shaped reverse yoke 48 having inwardly diverging arms and pivoted at its apex at 49 to the outer guide 42 of the slidable bar or member 40. When the catch 46 of one of the arms 45 is in engagement with the catch 47 of one of the sides of the reverse yoke, the other arm 45 extends into the path of a plurality of tappets 50 preferably provided with suitable anti-friction devices 51 and arranged to engage the inwardly projecting arm of the reverse lever for sliding the bar or member 40 outwardly to carry the feed port of the valve into register with the branch steam passage 17. The tappets maintain the feed port of the valve in register with the branch steam passage 17 during one-third of the travel of the piston along the arcuate steam chambers and the arm 45 of the lever 44 is then released to permit the feed port of the valve to be closed by the spring 43. The catch 47 forms a fulcrum for the lever 44 in actuating the slidable bar or member 40 in the outward movement thereof to open the feed port.

The valve actuating lever 44 is provided with an outwardly extending arm 52 which is connected by a link 53 with one of the sides or arms of the yoke 48. The other side or arm of the yoke is connected by a link 54 with an arm 55 of an operating lever 56. The arm 55 is also connected by a link 58 with the radially arranged link or connecting rod 38. The operating lever 56 is adapted to be shifted from the position shown in full lines in Fig. 2 of the drawing to the dotted line position illustrated in the said figure for moving the pivot 37 at the outer end of the rod or link 38 to opposite end of the slot 36 and for reversing the yoke 48 to carry the left hand arm or side out of engagement with the lever 44 and move the right hand side or arm into engagement with the said lever 44 which is simultaneously shifted to reverse its position and arrange the catch at the right hand side or arm of the lever 44 in position for engagement with the catch of the right hand side or arm of the yoke. The operating lever 56 is provided at the side opposite that at which the arm 55 is located with a similar arm 59 which is connected by links 60 and 61 with the reverse yoke and the link or rod 38 of the valve gear at the right hand side of the operating lever 56. The other valve gears are connected with each other by substantially V-shaped levers 62 each fulcrumed at its angle and having one arm connected by a link 63 with one side of the engaging yoke and its other side connected by links 64 and 65 with the yoke and the link or rod 38 of the adjacent valve gear. By this construction the valve gear of each valve is simultaneously operated when the lever 56 is oscillated.

What is claimed is:—

1. A rotary engine including a casing having a circular opening and provided at intervals with inwardly projecting partitions, said casing being provided at opposite sides of the partitions with feed and exhaust passages, a rotary piston arranged in the said opening in spaced relation with the wall thereof, the space between the piston and the casing being divided by the said partitions into a plurality of arcuate steam chambers, a plurality of abutment wheels mounted on the said piston and having projecting blades adapted to be engaged by the said partitions for rotating the abutment wheels, means for controlling the feed of steam to and the exhaust of the same from the arcuate steam chambers, locking devices comprising locking wheels connected with the abutment wheels and provided with recesses corresponding with the blades of the abutment wheels, a spring actuated locking member arranged to engage the said recesses for holding the locking wheels against rotary movement and cams located in the path of the locking members for releasing the locking wheels to permit the abutment wheels to be rotated by the said partitions.

2. A rotary engine including a casing, a rotary piston mounted within the casing, an oscillatory valve for controlling the admission of steam to the piston and the exhaust of steam therefrom and valve gear comprising an arm connected with the valve and having an arcuate slot extending to opposite sides of the valve, a radially arranged slidable member, means shiftable along the slot for connecting the slidable member with the said arm, a spring for moving the slidable member in one direction and means operated by the piston for moving the slidable member in the opposite direction.

3. A rotary engine including a casing, a rotary piston mounted within the casing, an oscillatory valve for controlling the admission of steam to the piston and the exhaust of steam therefrom and valve gear comprising an arm connected with the valve and extending from opposite sides thereof, a radially movable bar or member, means for connecting the bar or member with the said arms, said means being shiftable to opposite sides of the center of the arm, means for yieldably urging the bar or member in one direction, and means actuated by the piston for moving the bar or member in the opposite direction.

4. A rotary engine including a casing, a rotary piston mounted within the casing, an oscillatory valve for controlling the admission of steam to the piston and the exhaust of steam therefrom and valve gear comprising an arm connected at an intermediate point with the valve and extending from opposite sides of the same, a radially movable member, means shiftable from one end of the arm to the other for connecting the said arm to the said member, a pivotally mounted reverse yoke having opposite engaging portions, a lever pivoted at an intermediate point to the slidable member, and provided at opposite sides of its pivot with means for engaging the sides of the yoke whereby the lever is fulcrumed thereon and means carried by the piston for engaging the lever to actuate the sliding member.

5. A rotary engine including a casing, a rotary piston mounted within the casing, an oscillatory valve for controlling the admission of steam to the piston and the exhaust of steam therefrom and valve gear comprising an arm connected at an intermediate point with the valve and extending from opposite sides of the same, a radially movable member, means shiftable from one end of the arm to the other for connecting the said arm to the said member, a pivotally mounted reverse yoke having opposite engaging portions, a lever pivoted at an intermediate point to the slidable member, and provided at opposite sides of its pivot with means for engaging the sides of the yoke whereby the lever is fulcrumed thereon and means carried by the piston for engaging the lever to actuate the sliding member, and a spring connected with the said member for moving the same in the opposite direction.

6. A rotary engine including a casing, a rotary piston mounted within the casing, an oscillatory valve for controlling the admission of steam to the piston and the exhaust of steam therefrom and valve gear comprising an arm connected with the valve and extending from opposite sides thereof, a radially slidable bar or member, means shiftable from one end of the arm to the other for connecting the same with the slidable bar or member, a pivotally mounted reverse yoke provided at opposite sides with engaging portions, a reverse lever pivoted at an intermediate point and having angularly related arms, said lever being also provided with opposite catches for engaging with the sides of the yoke whereby the lever is fulcrumed thereon and tappets carried by the piston for engaging the said lever.

7. A rotary engine including a casing, a rotary piston mounted within the casing, an oscillatory valve for controlling the admission of steam to the piston and the exhaust of steam therefrom and valve gear comprising an arm connected with the valve, a radially slidable bar or member, a connecting rod extending from the bar or member to the arm and shiftable from one side of the valve to the other, a pivotally mounted yoke provided with opposite catches, a lever pivoted at an intermediate point to the said bar or member and having angularly related arms provided with catches to engage with those of the yoke whereby the lever is fulcrumed thereon, tappets carried by the piston for engaging the said lever to actuate the radially movable bar in one direction, yieldable means for moving the said bar or member in the opposite direction, an operating device connected with the connecting rod and the yoke for shifting the same and means for connecting the lever with the yoke for shifting the former.

8. A rotary engine comprising a casing, a rotary piston mounted within the casing, a plurality of oscillatory valves for controlling the admission and exhaust of steam to and from the piston, a valve gear for each of the valves comprising an arm connected with the valves and extending to opposite sides thereof, a radially movable bar or member, a rod connecting the bar or member with the arm and shiftable to opposite sides of the valves, a pivotally mounted yoke provided at opposite sides with catches, a lever fulcrumed at an intermediate point on the radially movable bar or member and having angularly related arms provided with catches to engage with those of the yoke, tappets carried by the piston for engaging the lever to move the bar or member in one direction, and yieldable means for moving the bar or member in the opposite direction, means for connecting the yoke with the lever, an operating lever having angularly related arms and located between two of the valve gears, substantially V-shaped levers located between the other valve gears and means for connecting the arms of the operating lever and the V-shaped levers with the yokes and the connecting rods of the valve gears for shifting the said parts.

In testimony whereof I affix my signature in presence of two witnesses.

CHARLES N. WIKANDER.

Witnesses:
HOWARD F. CONNELL,
J. D. HOPPER.

Copies of this patent may be obtained for five cents each, by addressing the "Commissioner of Patents, Washington, D. C."